United States Patent [19]
Kobayashi et al.

[11] Patent Number: 5,621,672
[45] Date of Patent: Apr. 15, 1997

[54] MULTITASK CONTROL SYSTEM

[75] Inventors: Minoru Kobayashi; Toshiaki Nagasawa; Makoto Suzuki; Shigeo Kobayashi, all of Sayama, Japan

[73] Assignee: Honda Giken Kogyo Kabushiki Kaisha, Tokyo, Japan

[21] Appl. No.: 638,091

[22] Filed: Apr. 26, 1996

Related U.S. Application Data

[63] Continuation of Ser. No. 222,484, Apr. 4, 1994, abandoned.

[30] Foreign Application Priority Data

Apr. 6, 1993 [JP] Japan ..................... 5-079663

[51] Int. Cl.$^6$ .................................................. G05B 19/18
[52] U.S. Cl. .......................... 364/579; 364/132; 364/133; 364/134; 901/42
[58] Field of Search .............................. 364/505, 474.12, 364/474.28, 131, 191, 579, 132, 133, 134, 138, 474.08; 395/325, 250, 61; 340/825.01, 870.17; 901/402, 6

[56] References Cited

U.S. PATENT DOCUMENTS

| | | | |
|---|---|---|---|
| 4,539,655 | 9/1985 | Trussell et al. | 340/825.01 |
| 4,684,862 | 8/1987 | Röhrle | 364/133 |
| 4,803,613 | 2/1989 | Kametani et al. | 364/132 |
| 4,831,582 | 5/1989 | Miller et al. | 364/134 |
| 4,835,730 | 5/1989 | Shimano et al. | 364/191 |
| 4,873,476 | 10/1989 | Kurakake et al. | 318/568.22 |
| 4,877,940 | 10/1989 | Bangs et al. | 395/11 |
| 4,879,644 | 11/1989 | Gottshall | 364/132 |
| 5,032,975 | 7/1991 | Yamamoto et al. | 364/134 |
| 5,119,318 | 6/1992 | Paradies et al. | 364/468 |
| 5,150,288 | 9/1992 | Imai et al. | 364/132 |
| 5,166,872 | 11/1992 | Weaver et al. | 364/133 |
| 5,229,931 | 7/1993 | Takeshima et al. | 364/131 |
| 5,231,302 | 7/1993 | Weigl et al. | 364/131 |
| 5,255,197 | 10/1993 | Iida | 364/132 |
| 5,282,139 | 1/1994 | Kobayashi | 364/131 |
| 5,337,229 | 8/1994 | Holland et al. | 364/131 |

FOREIGN PATENT DOCUMENTS

| | | |
|---|---|---|
| 0055782 | 7/1982 | European Pat. Off. . |
| 0269374 | 6/1988 | European Pat. Off. . |
| 0331747 | 9/1989 | European Pat. Off. . |
| 0590175 | 4/1994 | European Pat. Off. . |
| 61-223950 | 10/1986 | Japan . |
| 63-45640 | 2/1988 | Japan . |
| 63-86036 | 4/1988 | Japan . |
| 1-169540 | 7/1989 | Japan . |
| 2-297633 | 12/1990 | Japan . |
| 4-372022 | 12/1992 | Japan . |
| WO83/01520 | 4/1983 | WIPO . |
| 93/00620 | 1/1993 | WIPO . |

OTHER PUBLICATIONS

Kussl, V.: "Programmieren von Prozessrechnern", VDI–Verlag, Dusseldorf, 1975, pp. 72, 73.

Kaltenbach/Reetz/Woerrlein: "Das grosse Computer–Lexikon", Verlag Markt & Technik, 2nd ed., 1990, pp. 100, 204, 219, 266 and 267.

Manufacturing Technology International, 1991, London GB, pp. 255, 256, 258, 260, XP000227497, "Design Concept for a Robot Controller," M. Kametani et al.

Journal A, vol. 34, No. 1, Apr., 1993, Antwerpen BE, pp. 84–88, XP000369467, "Hedra: Heterogeneous Distributed Real–Time Architecture," H. Thielemans.

*Primary Examiner*—Ellis B. Ramirez
*Assistant Examiner*—Eric W. Stramber

[57] ABSTRACT

A control system for controlling operations of a plurality of controlled devices each capable of positioning a plurality of logical axes included therein to perform operations such as welding or assembling workpieces, wherein a parallel control of the respective devices is performed by a multitask processor, control of operations such as welding which require a real-time control in its nature is performed by a real-time processor, and a communication memory is provided between the both processors for transferring therebetween required commands and data for the positioning control or the operations control.

11 Claims, 14 Drawing Sheets

MULTITASK CONTROL SYSTEM

This application is a continuation of application Ser. No. 08/222,484 filed on Apr. 4, 1994, now abandoned.

BACKGROUND OF THE INVENTION

1. Field of the Invention

The present invention relates to a multitask control system, and more particularly to a control system for controlling operations of a plurality of controlled devices each capable of positioning a plurality of logical axes included therein to perform operations such as welding or assembling workpieces, wherein a parallel control of the respective devices is performed by a multitask processor, control of operations such as welding which require a real-time control by its nature is performed by a real-time processor.

2. Description of the Conventional Art

Various automatic apparatus including welding robots, assembling robots and so forth have heretofore been used in various manufacturing factories including automobile manufacturing lines. Generally, such automatic apparatus have positioning control capability for a plurality of logical axes in a welding gun or robot hand for welding or assembling workpieces, in which the positioning control is generally performed by a computer-based servomotor control system.

A typical automatic manufacturing line is composed of a plurality of automatic apparatus arranged along a processing sequence. The automatic apparatus are controlled individually or in combination for positioning or operation by a microprocessor-based sequencer or a computer-based controller.

Multitask control systems which are designed to control automatic apparatus of the type described above are disclosed in Japanese laid-open patent publications Nos. 63-86036 and 1-169540, for example. Here, multitask control refers to executing a plurality of tasks or jobs concurrently, by switching between tasks on a time-sharing basis each time an interrupt is entered. Real-time control refers to a process in which all of a series of necessary procedures including inputting, calculating, and outputting are completed until a next interrupt, and such processes are repeated each time an interrupt is entered.

Conventionally, target positions of respective axes (servomotors) included in a device have been given to a servomotor control system, and simultaneous arrival of the axes has been processed also on the servomotor control system side. Therefore, when there are a plurality of devices, the simultaneous arrival processing has to be repeated as many times as the number of devices, resulting in an increased amount of processing. Because an axis arrangement has to be altered by parameters, servo control processing is highly complex, and device processing is also complex.

When there are a plurality of devices to be controlled, it is preferable to use multitask processing to control respective devices concurrently. However, the multitask processing is not suited to control jobs which are real-time-oriented in their nature. If the controls of a plurality of devices are executed as a single task, the required description of a computer program becomes so complex that the reliability and performance of the program tend to be unsatisfactory. In addition, manpower required to develop and revise the program increases.

SUMMARY OF THE INVENTION

It is therefore an object of the present invention to provide a control system for controlling operations of a plurality of controlled devices each capable of positioning a plurality of logical axes included therein to perform operations such as welding or assembling workpieces, wherein a parallel control of the axes positioning in respective devices is performed by a multitask processor, and control of operations such as welding is performed by a real-time processor. This enables control of those operations requiring real-time control in their nature and allow the user of the system to generate the software (computer programs) easily without lowering the reliability and performance of the software. Thus, an increase in manpower to develop and revise the software is prevented.

To achieve the above object, there is provided in accordance with the present invention a multitask control system for controlling operations of a plurality of controlled devices, comprising a real-time processor having a controller for controlling the operations of the controlled devices, a multitask processor having a plurality of application tasks associated with the respective controlled devices, and a communication memory for transferring predetermined commands and/or data required to control the operations of the controlled devices, between said real-time processor and said multitask processor.

The multitask processor may further have a Programmable Logic Control (PLC) task for transmitting information to and receiving information from a sequencer for centralized control of the controlled devices.

The multitask control system may further comprise a control box having application tasks for communicating with the application tasks of said multitask processor, displaying data on a screen, and entering key inputs, the multitask processing further having a communication task for communicating with the application tasks of the control box.

The application tasks of the multitask processors may correspond respectively to the controlled devices, for transmitting target position data to the real-time processor through the communication memory and receiving present position data from the real-time processor through the communication memory, the real-time processor having means for calculating a distance to be traversed from a present position to a target position based on the target position data and the present position data, and outputting a speed command based on the distance.

Alternatively, the application tasks of the multitask processors may correspond respectively to the controlled devices, for transmitting pressurization and energization schedules and a current command to weld a workpiece to the real-time processor through the communication memory, the real-time processor having means for outputting a command to operate a welding gun based on the pressurization and energization schedules and the current command.

As described above, the multitask control system has the real-time processor having the controller for controlling operation, e.g., position and/or movement, of the controlled devices. The real-time processor can thus control the controlled devices on a real-time basis, control operation of welding guns, or energization of servomotors which move such welding guns.

To effect positional and/or operation control in the real-time processor, the multitask control system also has the multitask processor which includes the application tasks associated respectively with the logical axes and/or the control devices. The multitask processor gives operating conditions for the welding guns and confirms the completion of the operation of the welding guns, or gives target position data for the positional control of the servomotors and confirm the operation of the servomotors from positional data thereof.

The communication memory is provided between the real-time processor and the multitask processor, and transfers, for example, the operating conditions of the welding guns, or target position data and present position data, from the real-time processor to the multitask processor, or from the multitask processor to the real-time processor.

More specifically, the application tasks correspond respectively to the logical axes, and given the target position data through the communication memory to the real-time processor and receive the present position data from the real-time processor. The real-time processor calculates distances to be traversed from present positions to target positions based on the target position data and the present position data, and outputs a speed command based on the distances for controlling the operation of the servomotors.

The multitask processor has the PLC task for transmitting information to and receiving information from the sequencer for centralized control of the controlled devices. The control box has the application tasks for communicating with the application tasks of the multitask processor, displaying data on a screen, and entering key inputs, the multitask processing further having the communication task for communicating with the application tasks of the control box.

Therefore, controlling processes for the controlled devices are multitasked by the multitask processor, and the control function, which is required to be performed immediately, to control welding operation or the like is performed on a real-time basis by the real-time processor. Therefore, the multitask control system can handle control processes that are real-time-oriented in their nature, and allows the user to generate programs easily without lowering the reliability and performance, for thereby preventing the manpower required to develop and revise programs from increasing.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

1st Embodiment

Figure 1:
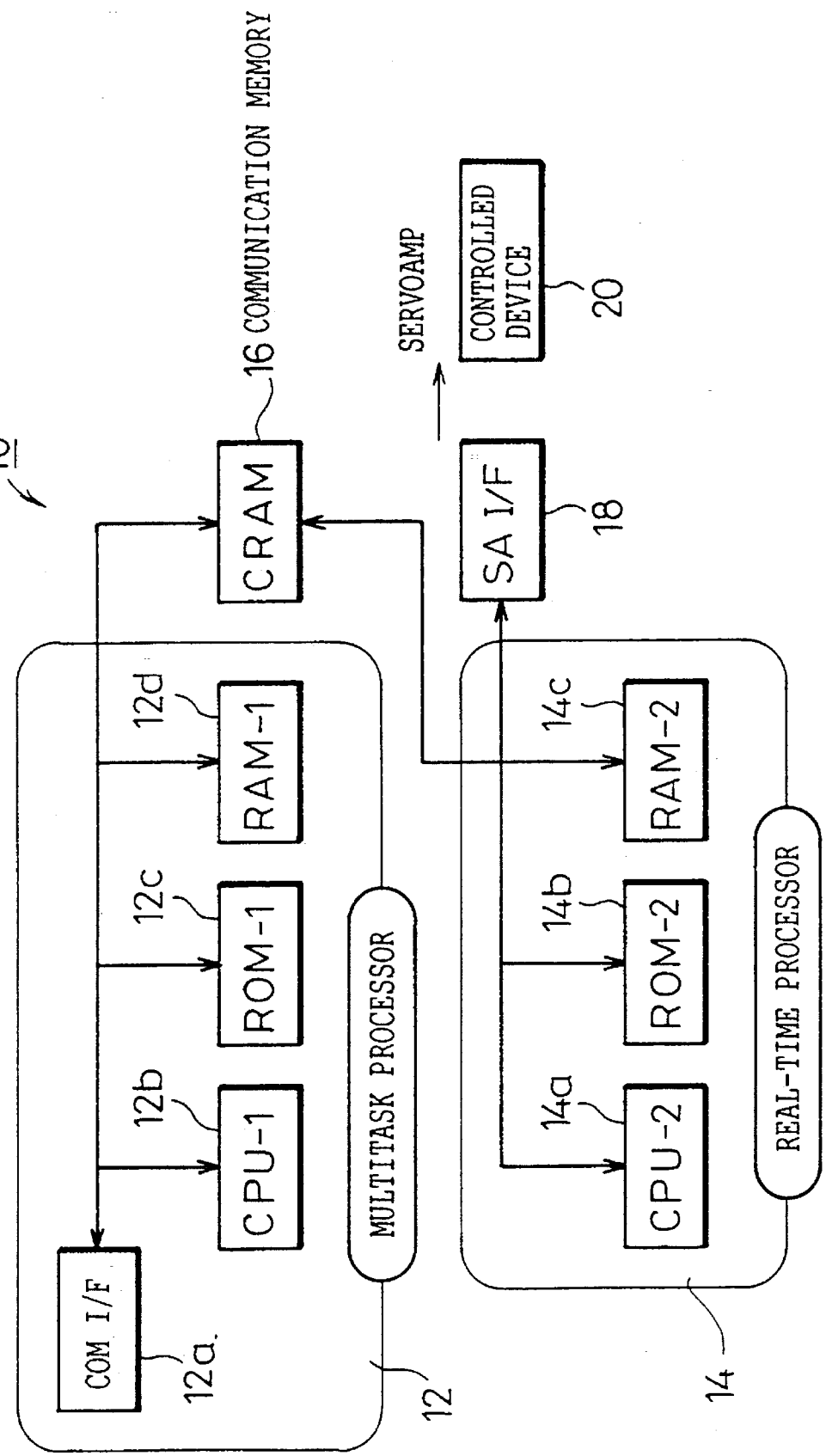
FIG. 1 is a block diagram of a multitask control apparatus which incorporates a multitask control system according to the present invention.

FIG. 1 shows in block form a multitask control apparatus 10 which incorporates a multitask control system according to the present invention. The multitask control apparatus 10 generally comprises a multitask processor 12, a real-time processor 14, and a communication memory 16.

The multitask processor 12 comprises a communication interface (COM I/F) 12a for communication with a control box (TBOX) 22 (described later on), a microprocessor (CPU-1) 12b, a read-only memory (ROM-1) 12c, and a random-access memory (RAM-1) 12d. The real-time processor 14 comprises a microprocessor (CPU-2) 14a, a read-only memory (ROM-2) 14b, and a random-access memory (RAM-2) 14c.

The ROM-1 12c stores various tasks including an application task for positioning various axes of controlled devices 20 such as welding robots or assembling robots, and an application task for a welding process. The ROM-2 14b stores a program for positioning control in the real-time processor 14 and a program for gun/transformer control for welding purpose.

The real-time processor 14 is connected to the controlled devices 20, for controlling positioning and operation of the controlled devices 20. In FIG. 1, the real-time processor 14 is connected to a servoamplifier interface (SA I/F) 18, for applying control output signals to servoamplifiers to energize servomotors in the controlled devices 20 to position a welding hand or a robot hand of the controlled devices 20.

Figure 2:
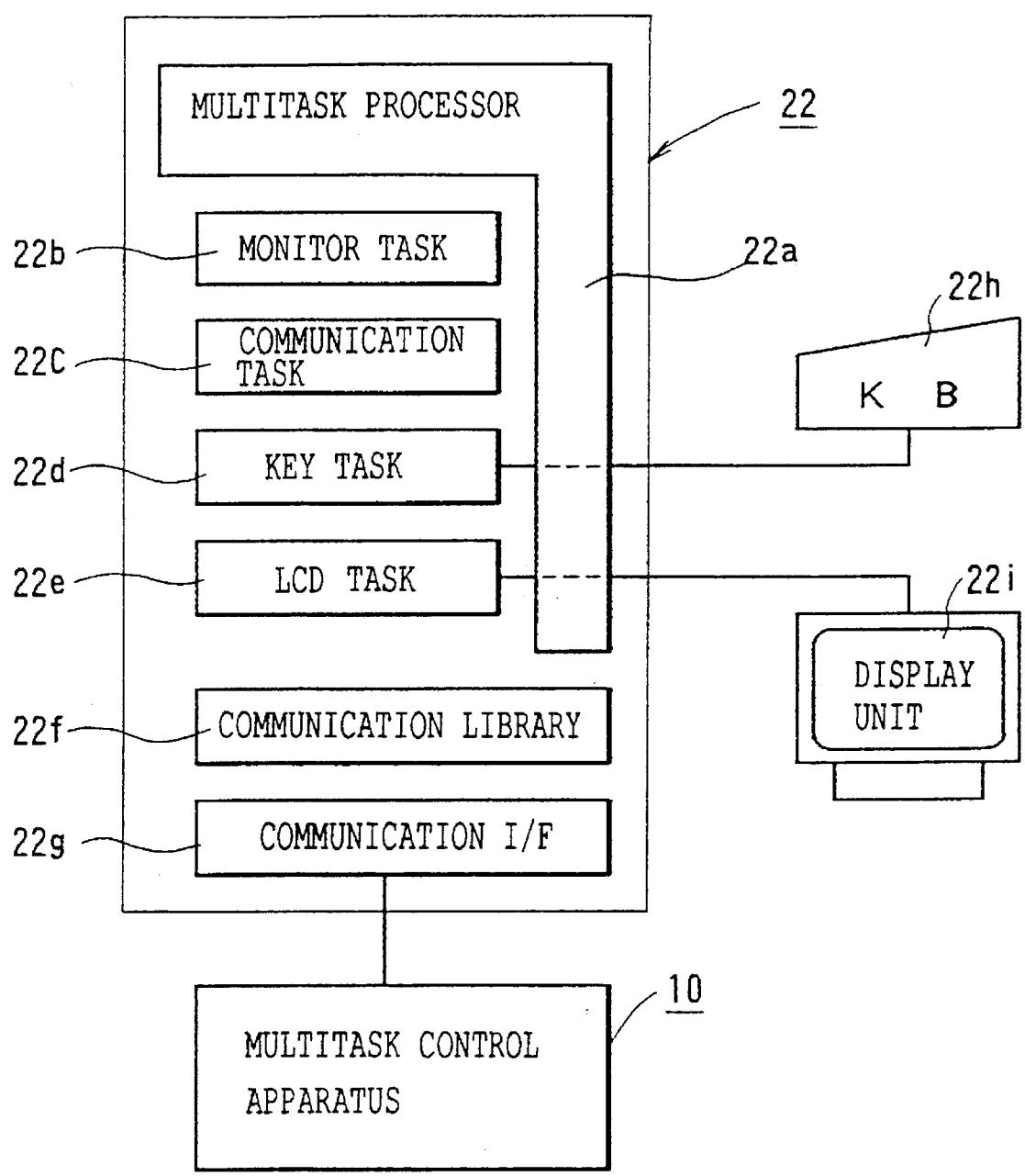
FIG. 2 is a block diagram showing a logic arrangement of a control box.

FIG. 2 shows in block form a logic arrangement of the control box 22 which communicates with the application tasks of the multitask control apparatus 10 and performs display and key-entry functions. The control box 22 is composed only of a multitask processor 22a in which a monitor task 22b, a communication task 22c, a KEY task 22d, and a liquid crystal display (LCD) task 22e are registered as application tasks. The multitask processor 22a has a communication library 22f which is a program library that stores programs for effecting inter-task communication between the multitask control apparatus 10 and the control box 22 through the communication task 22c. The communication library 22f is connected to the multitask control apparatus 10 through a communication interface 22g for sending and receiving commands and data.

The LCD task 22e displays data transmitted from the multitask control apparatus 10 on the display screen of an LCD unit 22i. The LCD task 22e performs a remote screen control function to control the LCD screen based on special sequence data in the data transmitted from the multitask control apparatus 10, and also performs a remote connect function to select a communication entity to which the KEY task 22d is to transmit data.

The KEY task 22d transmits data to the multitask control apparatus 10 based on key strokes on a keyboard 22h. The data transmitted from the KEY task 22d are sent to a task that has been selected by the remote connect function performed by the LCD task 22e. The KEY task 22d is operable in a normal mode and a numeric entry mode. In the numeric entry mode, the LCD unit 22i displays a numeric entry window on its display screen. The user sets numeric data to be transmitted in the numeric entry window using a ten-key pad on the keyboard 22h. When an entry key on the keyboard 22h is thereafter pressed by the user, the numeric entry window is finished, and the numeric data are transmitted to the multitask control apparatus 10. Switching between the normal mode and the numeric entry mode is controlled by the sequence data for controlling the LCD screen.

Direct data exchange between the KEY task 22d and the LCD task 22e is basically not effected in the control box 22, but such data exchange is carried out through the application tasks in the multitask control apparatus 10.

Figure 3:
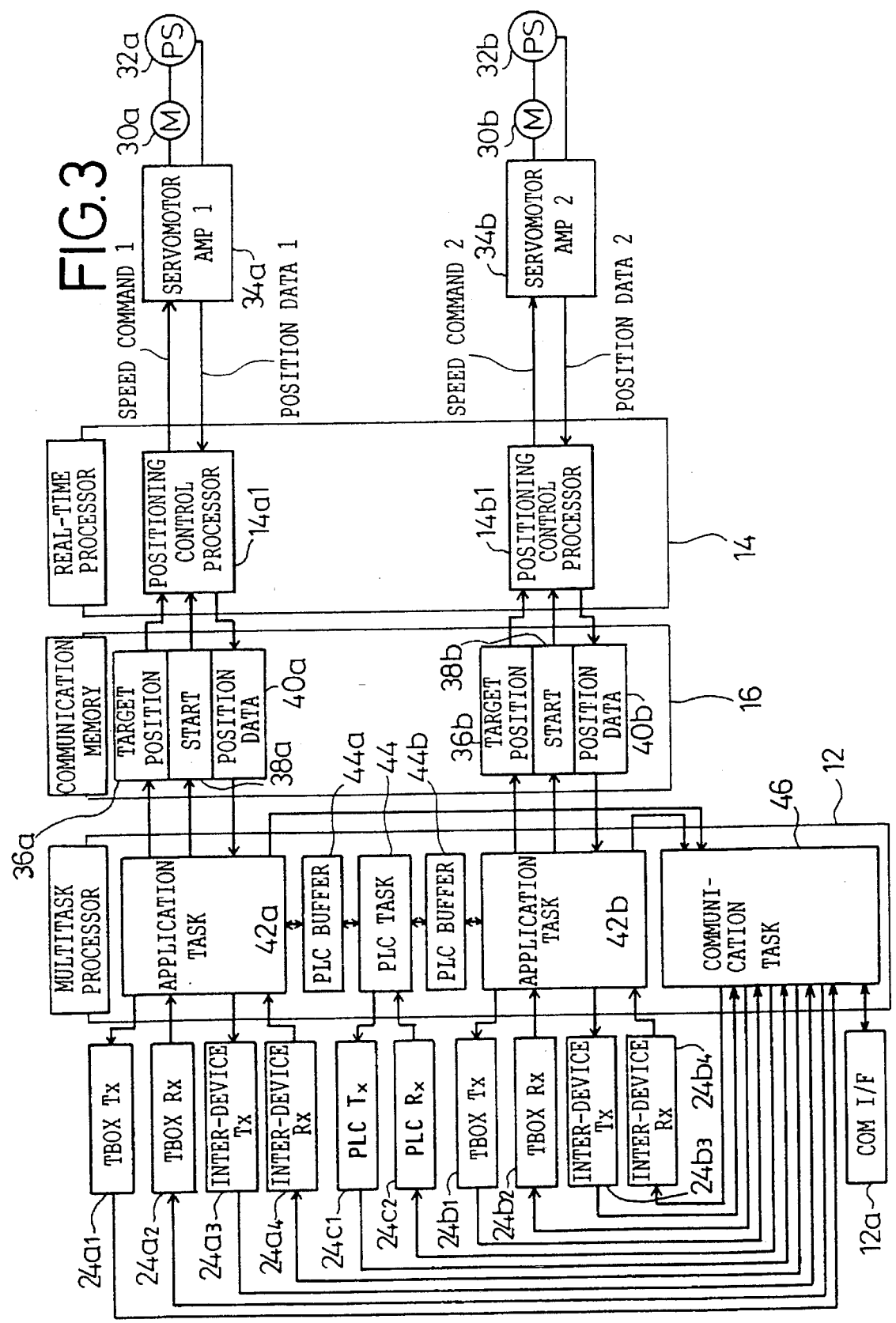
FIG. 3 is a block diagram of a multitask control system according to a first embodiment of the present invention.

FIG. 3 shows in block form a multitask control system according to a first embodiment of the present invention. Those reference numerals shown in FIG. 3 which are identical to those shown in FIG. 1 denote identical parts. The multitask control system is shown in FIG. 3 by way of illustrative example as controlling two uniaxial positioning devices, such as positioning robots, corresponding to the respective logic axes in the controlled devices 20. The two uniaxial positioning devices of the controlled devices 20 include two respective servomotors 30a, 30b and two position detectors 32a, 32b mechanically connected to the servomotors 30a, 30b, respectively. The servomotor 30a and the position detector 32a are electrically connected to a servomotor amplifier 34a, and the servomotor 30b and the position detector 32b are electrically connected to a servomotor amplifier 34b.

When supplied with speed commands, the servomotor amplifiers 34a, 34b control the rotational speeds of the servomotors 30a, 30b, and output detected positions from the position detectors 32a, 32b as present position data. The speed commands and the positional data are supplied from and to the real-time processor 14. The real-time processor 14 has positioning control processors 14a1, 14b1 associated respectively with the logical axes, i.e., the servomotor amplifiers 34a, 34b, for energizing the servomotors 30a, 30b to bring and hold the positioning devices to and in target positions. The positioning control processors 14a1, 14b1 give speed commands to the respective servomotor amplifiers 34a, 34b, and receive present position data 40a, 40b of the servomotors 30a, 30b based on the detected positions from the position detectors 32a, 32b.

The positioning control processors 14a1, 14b1 start to operate when target positions 36a, 36b and start commands 38a, 38b are set in the communication memory 16. The positioning control processors 14a1, 14b1 also set the detected positions from the position detectors 32a, 32b as the present position data 40a, 40b in the communication memory 16.

The communication memory 16 is connected to the multitask processor 12 for transmitting data between the multitask processor 12 and the real-time processor 14. The multitask processor 12 has application tasks 42a, 42b for giving the target positions 36a, 36b and the start commands 38a, 38b to the positioning control processors 14a1, 14b1 of the real-time processor 14 to energize the servomotors 30a, 30b, and confirming the operation of the servomotors 30a, 30b based on the present position data 40a, 40b.

The application tasks 42a, 42b has a login function for allowing controlling operations to be effected from respective control boxes 22, so that the servomotors 30a, 30b can be controlled from the control boxes 22. The control boxes 22 have independent communication buffers 24a1–24a4, 24b1–24b4, respectively, corresponding to the respective servomotors 30a, 30b, so that the two control boxes 22 can independently be operated at the same time.

The multitask processor 12 also has a PLC, Programmable Logic Control, (sequencer) task 44 for exchanging information for PLC and centralized control and supplying results to the application tasks 42a, 42b. The PLC task 44 reads and writes sequencer contact data (common contact data including servo-on data, start data, manual operation data, function-on data, and pattern No. data, and individual contact data including stop data, alarm data, interlock answer data, start condition data, interlock data, watch-dog data, and normal signal data) from and into PLC buffers 44a, 44b at all times. Therefore, centralized control is made possible by the sequencer.

All communications between the multitask processor 12 and the control boxes 22 or the PLC (sequencer) are carried out through a communication task 46 and the communication interface 12a. The other party of communication which communicates with the communication task 46 is selected individually by each task. Communication buffers 24c1, 24c2 serve for the PLC task 44 to communicate with the PLC.

The communication task 46 effects communications of such a type that it transmits data to a destination which is determined by the transmitter, the receiver basically does not reject entered data, and it is up to the application tasks 42a, 42b and the PLC task 44 of the receiver to decide whether the entered data are to be used or not. Therefore, it is not necessary to select the other party of communication for those tasks which handle received data only, and it is necessary to select the other party of communication only for those tasks which transmit data.

Other parties of communication are tasks, and data are transmitted from a task to a task by way of inter-task communications. Thus, selecting the other party of communication means indicating a task, and needs to select a node number and a task number. To perform such a function, the communication task 46 sends received data to the reception buffer of a destination task, and transmits data set in the transmission buffer of each task to a task of another node as the other party of communication that is selected by each task.

The communication buffers 24a1–24a4, 24b1–24b4, 24c1, 24c2 are buffers for achieving such inter-task communications, and are provided in pairs of reception and transmission buffers. If there are data to be transmitted, then each application task selects the other party of communication and sets the data in a transmission buffer, and the communication task 46 transmits the data to the other party of communication. If there are data that are received, the communication task 46 sets the data directed to itself in a reception buffer, and the corresponding application task 42a or 42b reads the data from the reception buffer.

In the multitask control system, the user operates each device connected by a communication line using the control box 22. Since communications are effected as intertask communications, the user operates an application task of each device. First, the user determines, with the control box, which device and which application task are to be operated. Then, the control box sends a usage start request to the determined application task.

In response to the usage start request from the control box, the application tasks 42a, 42b start sending various preprogrammed items of display information to the control box. Then, the application tasks 42a, 42b receive control information from the control box, and can call various preprogrammed display functions through the operation of the control box. A process of making the control box operable with respect to a certain application task is referred to "login", and a process of interrupting the operation of the control box and making the control box capable of selecting an application task to be operated is referred to as "logout".

Standard application tasks which need to be operated by the control box 22 require functions to effect login and logout, and are operated by a menu selection using function keys. The function keys include five function keys F1~F5. A processing program for the control box 22 is generated such that when a function key is pressed, a status variable is varied, and any of various functions can be called by a combination of the status variable and the pressed function key. The application task producer first selects a function to be performed, designs an operation process, converts the operation process into a status transition diagram, allocates numbers to various statuses of the status transition diagram, and uses the allocated numbers as the numbers of status variables, thereby producing an application task.

2nd Embodiment

Figure 4:
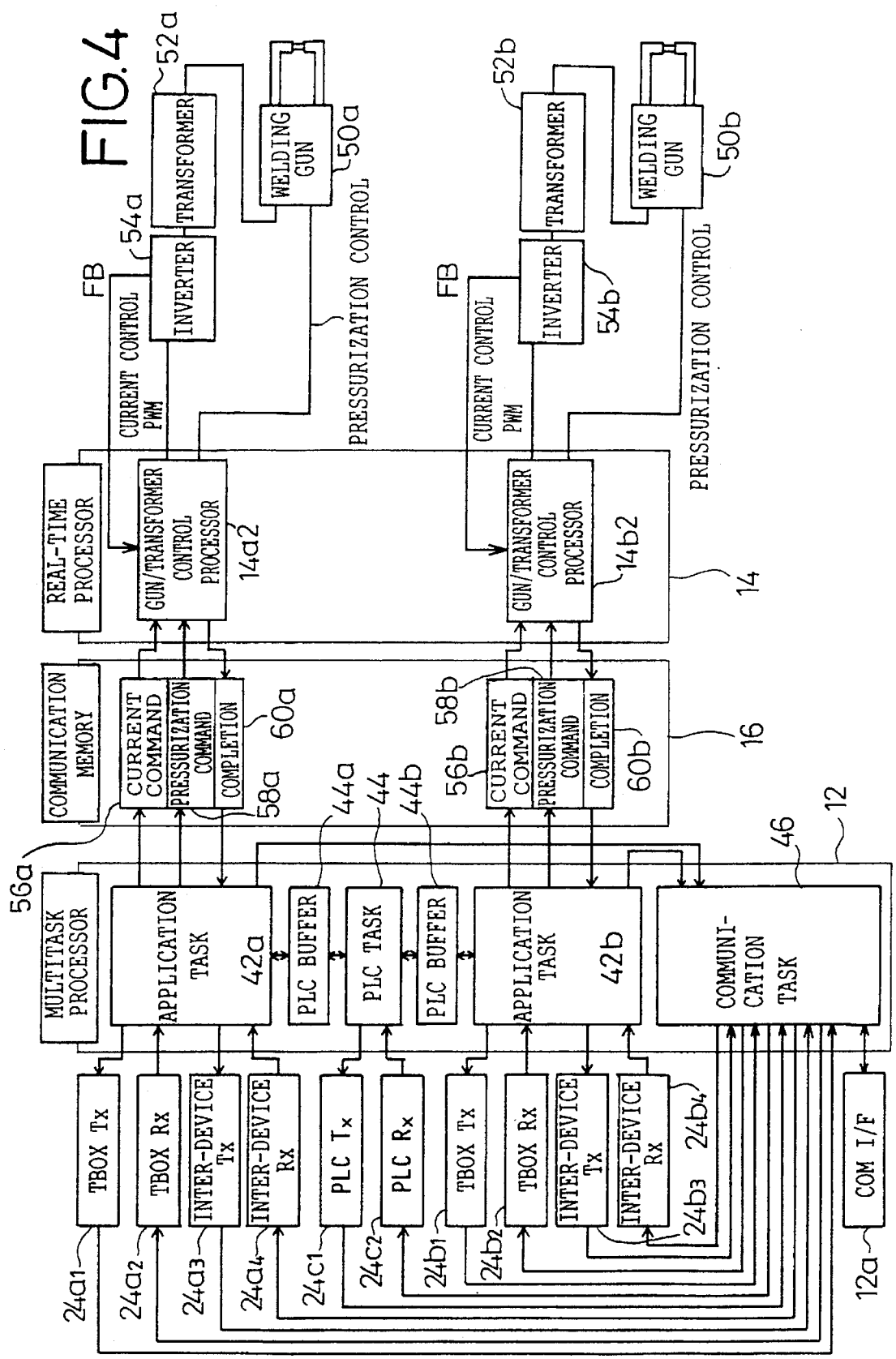
FIG. 4 is a block diagram of a multitask control system according to a second embodiment of the present invention.

FIG. 4 shows a multitask control system according to a second embodiment of the present invention. Those reference numerals shown in FIG. 4 which are identical to those shown in FIG. 1 denote identical parts. The multitask control system is shown in FIG. 4 by way of illustrative example as controlling two welding devices such as welding robots in the controlled devices 20. The controlled devices 20 include two respective welding guns 50a, 50b and two transformers 52a, 52b, which are connected to respective inverters 54a, 54b.

The inverters 54a, 54b are supplied with Pulse-Width Modulate (PWM) commands and output current feedback (FB) signals. The PWM commands are supplied from and the current feedback signals are supplied to a real-time processor 14. The real-time processor 14 also supplies valve control signals for controlling opening and closing movement of the welding guns 50a, 50b.

The real-time processor 14 has gun/transformer control processors 14a2, 14b2 associated with the respective welding robots, i.e., the inverters 54a, 54b, the transformers 52a, 52b, and the welding guns 50a, 50b, for welding workpieces according to specified pressurization and energization schedules and controlling the supply of a specified constant current to the welding guns. When current commands 56a, 56b and pressurization commands 58a, 58b are set in a communication memory 16, the gun/transformer control processors 14a2, 14b2 start operating to weld workpieces and control the current supplied to weld the workpieces. When the energization of the welding guns 50a, 50b and the control of the current are over, the gun/transformer control processors 14a2, 14b2 output completion signals 60a, 60b to the communication memory 16.

The communication memory 16 is connected to the multitask processor 12 for transmitting data between the multitask processor 12 and the real-time processor 14. The multitask processor 12 has application tasks 42a, 42b for giving current commands 56a, 56b to output an energization schedule and pressurization commands 58a, 58b to the gun/transformer control processors 14a2, 14b2, and confirming the completion of a welding process with the completion signals 60a, 60b.

The application tasks 42a, 42b has a login function for allowing controlling operations to be effected from a control box 22, so that energization and welding conditions can be set from the control box 22. The application tasks 42a, 42b may be used in combination with the positioning control of the multitask control system according to the first embodiment described above.

First, the other party of communication which is to communicate with between the application tasks is set. Then, when a welding command is executed on the positioning control side, a predetermined positioning process is carried out, and thereafter a welding condition number of the welding command is sent to an application task of the welding control side, from which pressurization and energization schedules corresponding to the welding condition number are read and sent to the real-time processor 14 through the communication memory 16 for welding workpieces. Though no welding under centralized control is effected, some contacts of a PLC (sequencer) are used. Communication buffers 24a1~24a4, 24b1~24b4, 24c1, 24c2, a communication task 46, PLC buffers 44a, 44b, and a PLC task 44 have the same functions as those shown in FIG. 3.

The above welding control system shown in FIG. 4 and the positioning control system shown in FIG. 3 may be combined into a welding robot system described below.

Welding Robot System Using the Multitask Control System

Figure 5:
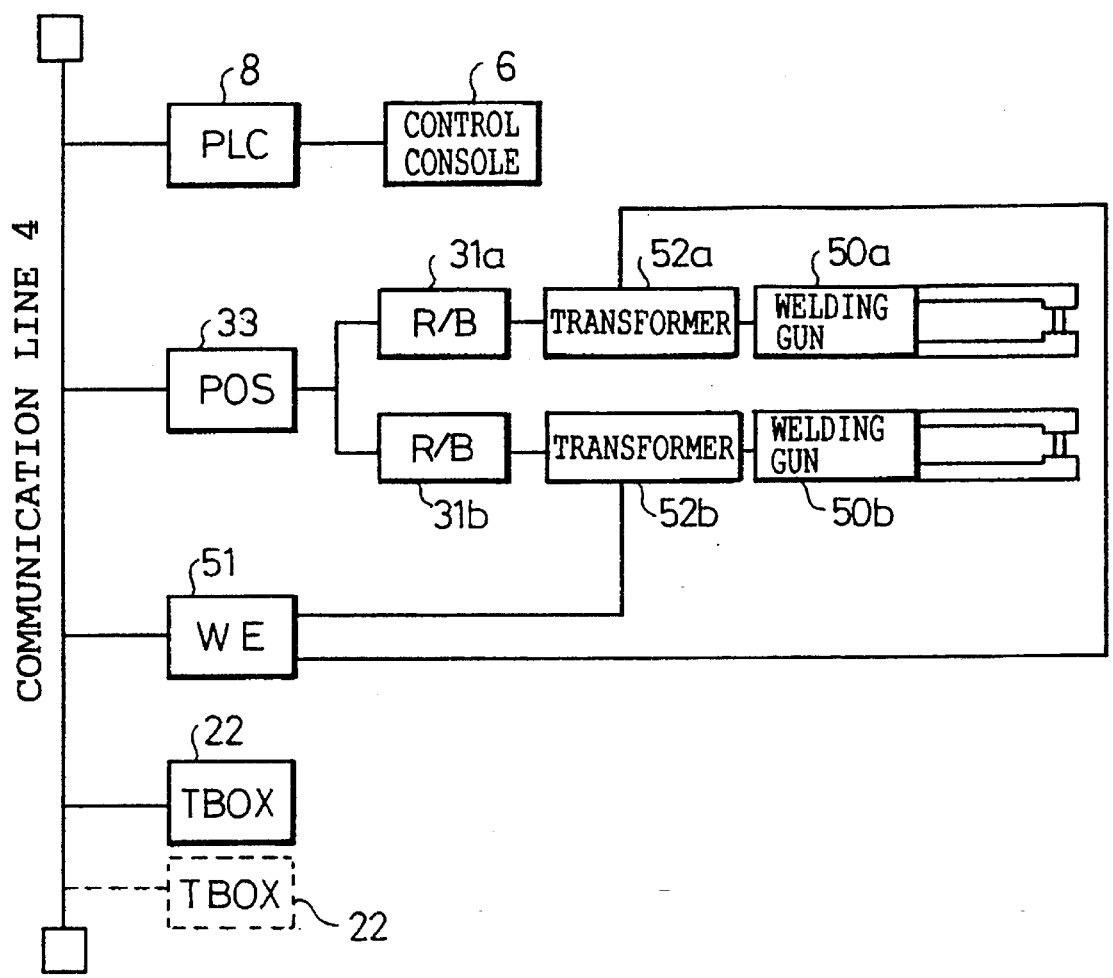
FIG. 5 is a block diagram of a welding robot system.

FIG. 5 shows in block form a welding robot system which incorporates the multitask control system according to the present invention. To the multitask control apparatus there are connected through a communication line 4 a sequencer (PLC) 8, a control box (TBOX) 22, a positioning driver (POS) 33, and a welding driver (WE) 51.

The positioning driver 33 actuates positioning robots (R/B) 31a, 31b to position respective welding guns 50a, 50b into respective desired positions under the control of the positioning control processors 14a1, 14b1 (see FIG. As shown in FIG. 3, the positioning robots 31a, 31b are composed of the respective servomotor amplifiers 34a, 34b and the respective servomotors 30a, 30b. The welding driver 51 energizes transformers 52a, 52b to enable welding guns 50a, 50b to weld workpieces under the control of the gun/transformer control processors 14a2, 14b2 (see FIG. 4).

Figure 6:
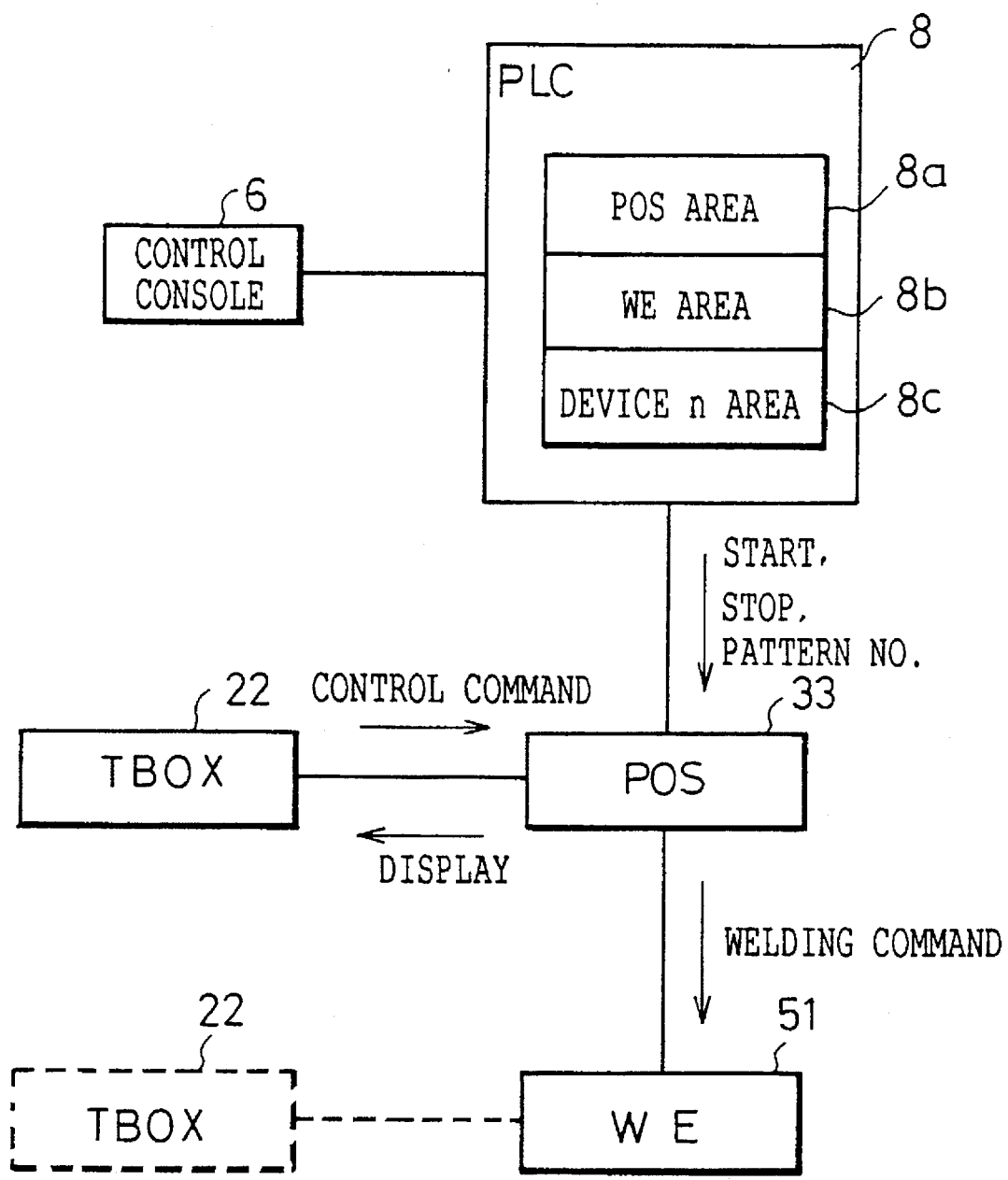
FIG. 6 is a block diagram showing a control hierarchical structure of the welding robot system.

FIG. 6 shows a control hierarchical structure of the welding robot system shown in FIG. 5. As shown in FIG. 6, the sequencer (PLC) 8 has internal contacts that are grouped into areas corresponding to the respective devices, i.e., a POS area 8a, a WE area 8b, and a device n area 8c, which can be accessed by the respective devices, i.e., the positioning driver (POS) 33, the welding driver (WE) 51, and a device n. The contents of internal contact data can be defined by the respective devices, and may be set from a control console 6. Signals indicative of start, stop, pattern number, etc., which are represented by the statuses of the internal contacts are sent to the positioning driver 33 and the welding driver 51.

Control and welding commands from the control boxes 22 are sent to the positioning driver 33 and the welding driver 51. A playback process which executes, step by step, a welding process that has been taught from the control boxes 22 is started by a control command supplied to the positioning driver 33 from the corresponding control box 22 and a welding command supplied to the welding driver 51 from the corresponding control box 22.

Figure 7:
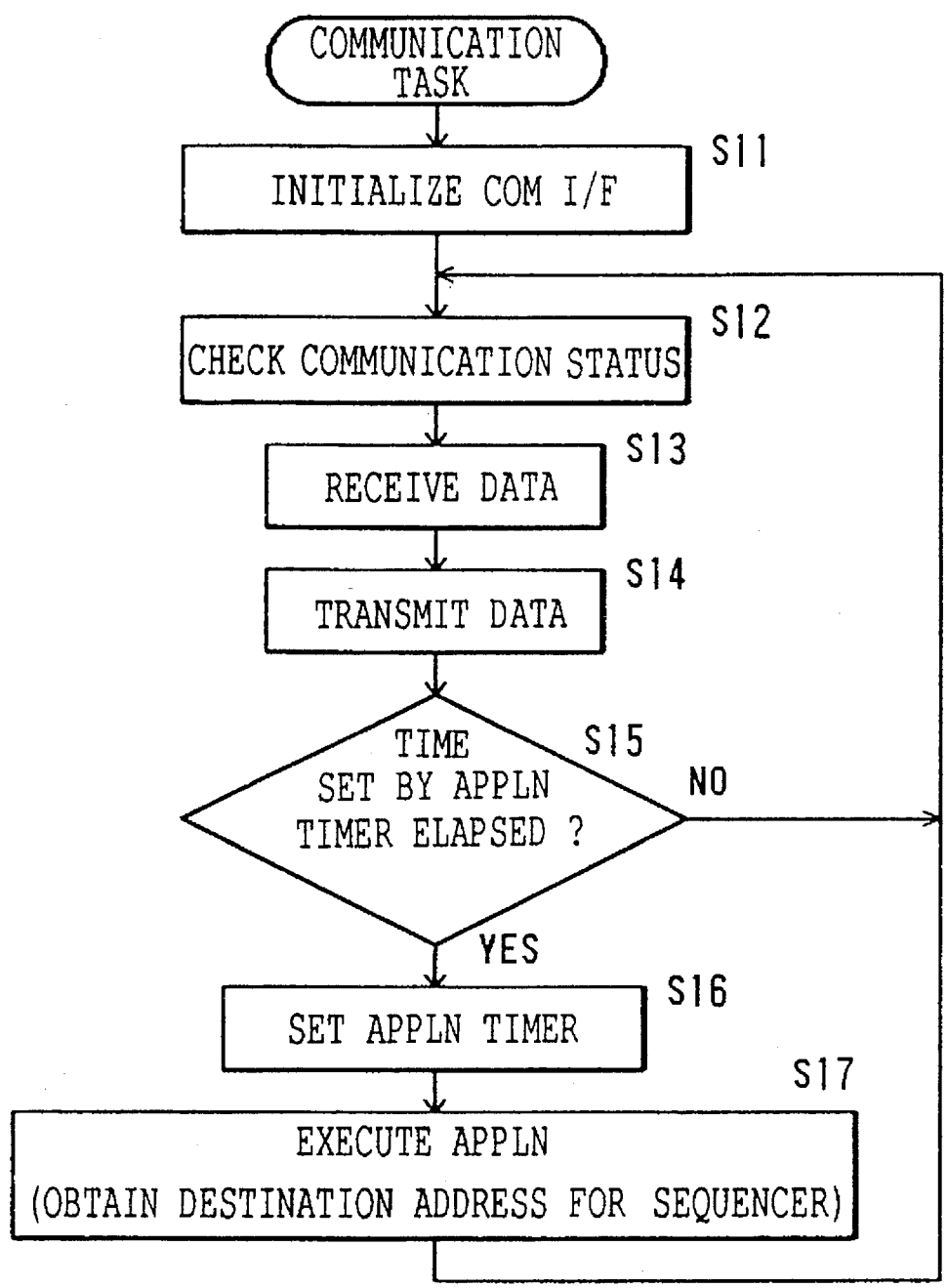
FIG. 7 is a flowchart showing a processing sequence of a communication task.

FIG. 7 shows a processing sequence of the communication task 46. In FIG. 7, the communication interface 12a is initialized in a step S11. The communication task 46 checks a communication status in a step S12, receives data in a step S13, and transmits in a step S14. Thereafter, the communication task 46 detects whether the time set by an application timer has elapsed or not. If not elapsed, then control returns to the step S12 in which the communication task 46 checks a communication status again. If elapsed, then control goes to a step S16 in which the communication task 46 sets the application timer. Thereafter, the communication task 46 executes an application to obtain a destination address for the PLC (sequencer) in a step S17, after which control returns to the step S12.

Figure 8:
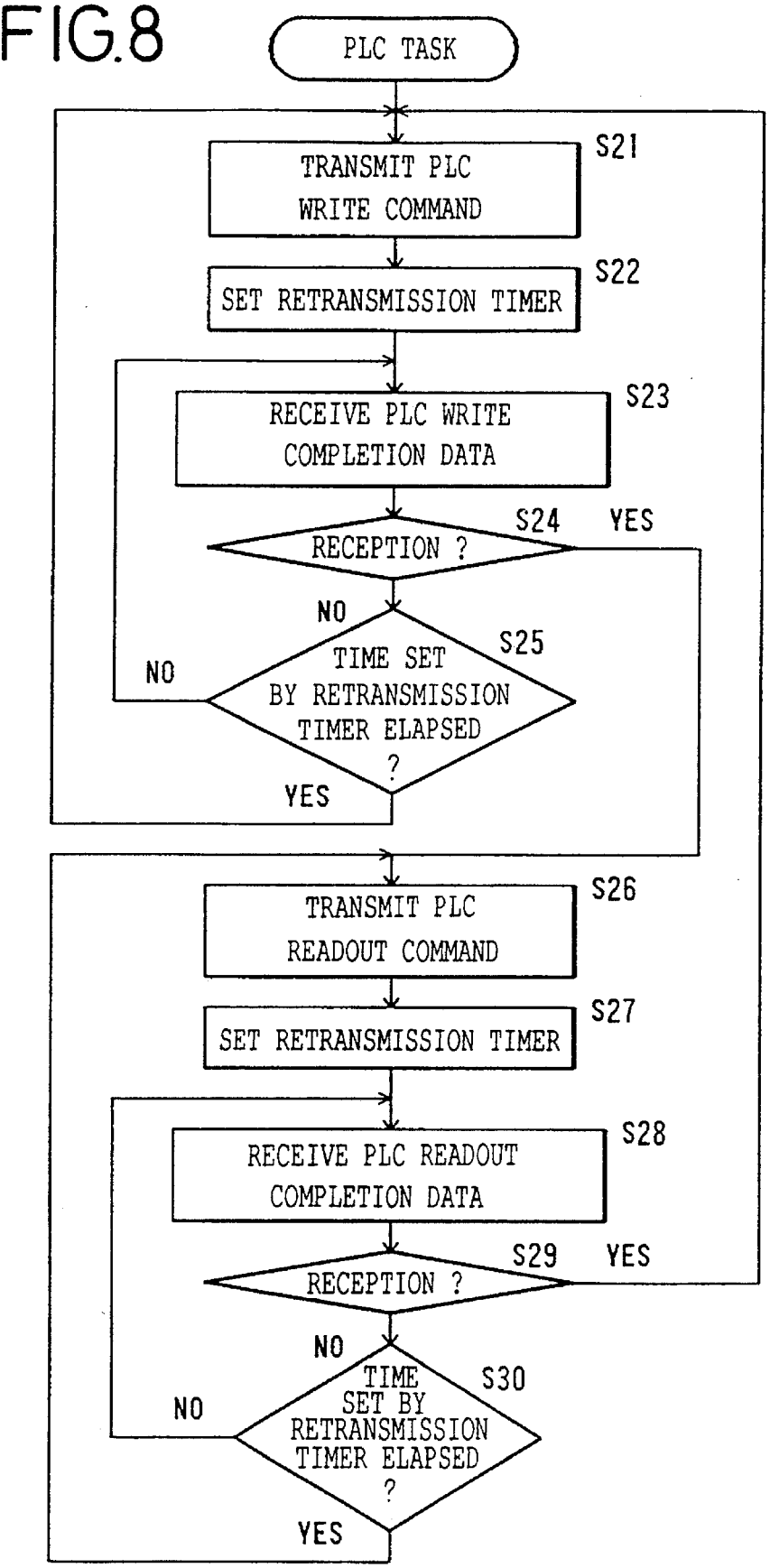
FIG. 8 is a flowchart showing a processing sequence of a PLC task.

FIG. 8 shows a processing sequence of PLC task 44. As described above, the internal contacts of the PLC task 44 are grouped into areas corresponding to the respective devices, i.e., a POS area 8a, a WE area 8b, and a device n area 8c, which can be accessed by the respective devices, i.e., the positioning driver (POS) 33, the welding driver (WE) 51, and a device n. The contents of internal contact data can be defined by the respective devices, and may be set from a control console 6 (see FIG. 6).

The PLC task 44 transmits a PLC write command in a step S21, sets a retransmission timer in a step S22, and receives PLC write completion data in a step S23. Then, the PLC 44 detects whether there is a reception or not in a step S24. If there is a reception, then control jumps to a step S26. If there is no reception, then the PLC 44 determines whether the time set by the retransmission timer has elapsed or not S25. If not elapsed, then control returns to the step S23. If elapsed, then control returns to the step S21.

In the step S26, the PLC 44 transmits a PLC readout command. Then, the PLC 44 sets the retransmission timer in a step S27, and receives PLC readout completion data in a step S28. Then, the PLC 44 detects whether there is a reception or not in a step S29. If there is a reception, then control goes back to the step S21. If there is no reception, then the PLC 44 determines whether the time set by the retransmission timer has elapsed or not in a step S30. If not elapsed, then control returns to the step S28. If elapsed, then control returns to the step S26.

Figure 9:
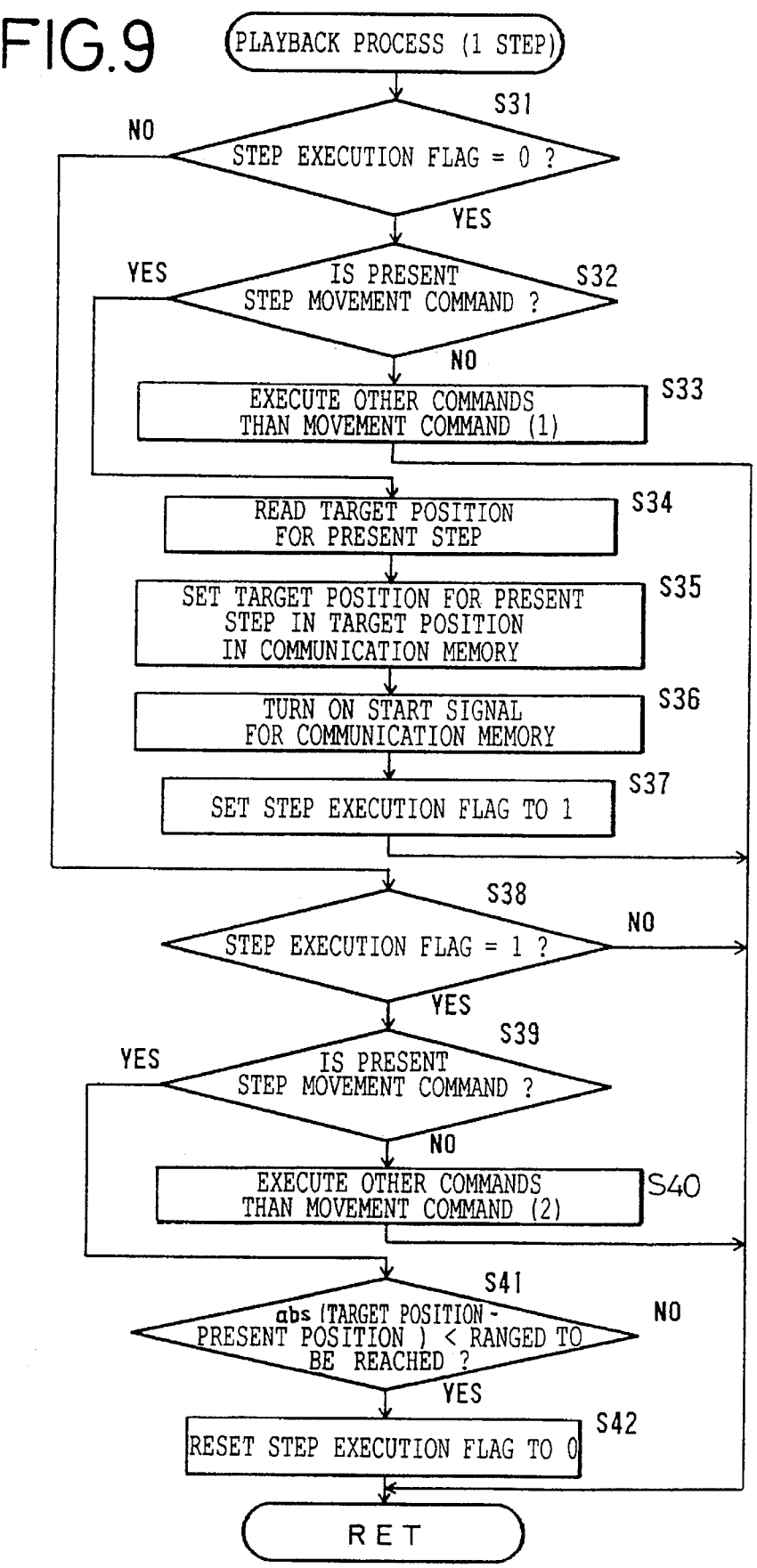
FIG. 9 is a flowchart showing a positioning sequence of an application task.

FIG. 9 shows a positioning sequence of the application tasks 42a, 42b, the positioning sequence being a playback process which executes, step by step, a welding process that has been taught from the control boxes 22.

The application tasks 42a, 42b determine whether a step execution flag is "0" or not in a step S31. If the step execution flag is not "0", then control jumps to a step S38. If the step execution flag is "0", then the application tasks 42a, 42b determine whether the present step is a movement command or not in a step S32. If not a movement command, the application tasks 42a, 42b execute other commands than the movement command in a step S33.

If the present step is a movement command, then control proceeds to a step S34 in which the application tasks 42a, 42b read a target position for the present step. The application tasks 42a, 42b then set the target position for the present step in target positions 36a, 36b (see FIG. 3) in the communication memory 16 in a step S36. The application tasks 42a, 42b turn on a start signal for the communication memory 16 in a step S36, and sets the step execution flag to "1" in a step S37.

In the step S38, the application tasks 42a, 42b determine whether the step execution flag is "1" or not. If the step execution flag is not "1", then the processing is ended. If the step execution flag is "1", then the application tasks 42a, 42b determine whether the present step is a movement command or not in a step S39. If not a movement command, the application tasks 42a, 42b execute other commands than the movement command in a step S40.

If the present step is a movement command, then control proceeds to a step S41 in which the application tasks 42a, 42b subtract present position data 40a, 40b from the target positions 36a, 36b in the communication memory 16, and determine whether the difference is in a range to be reached or not. The present position data 40a, 40b have been written in the communication memory 16 by the real-time processor 14.

If the difference is in the range to be reached in the step S41, then the application tasks 42a, 42b reset the step execution flag to "0" in a step S42, and the processing is finished. If the difference is not in the range to be reached, then the processing is finished.

Figure 10:
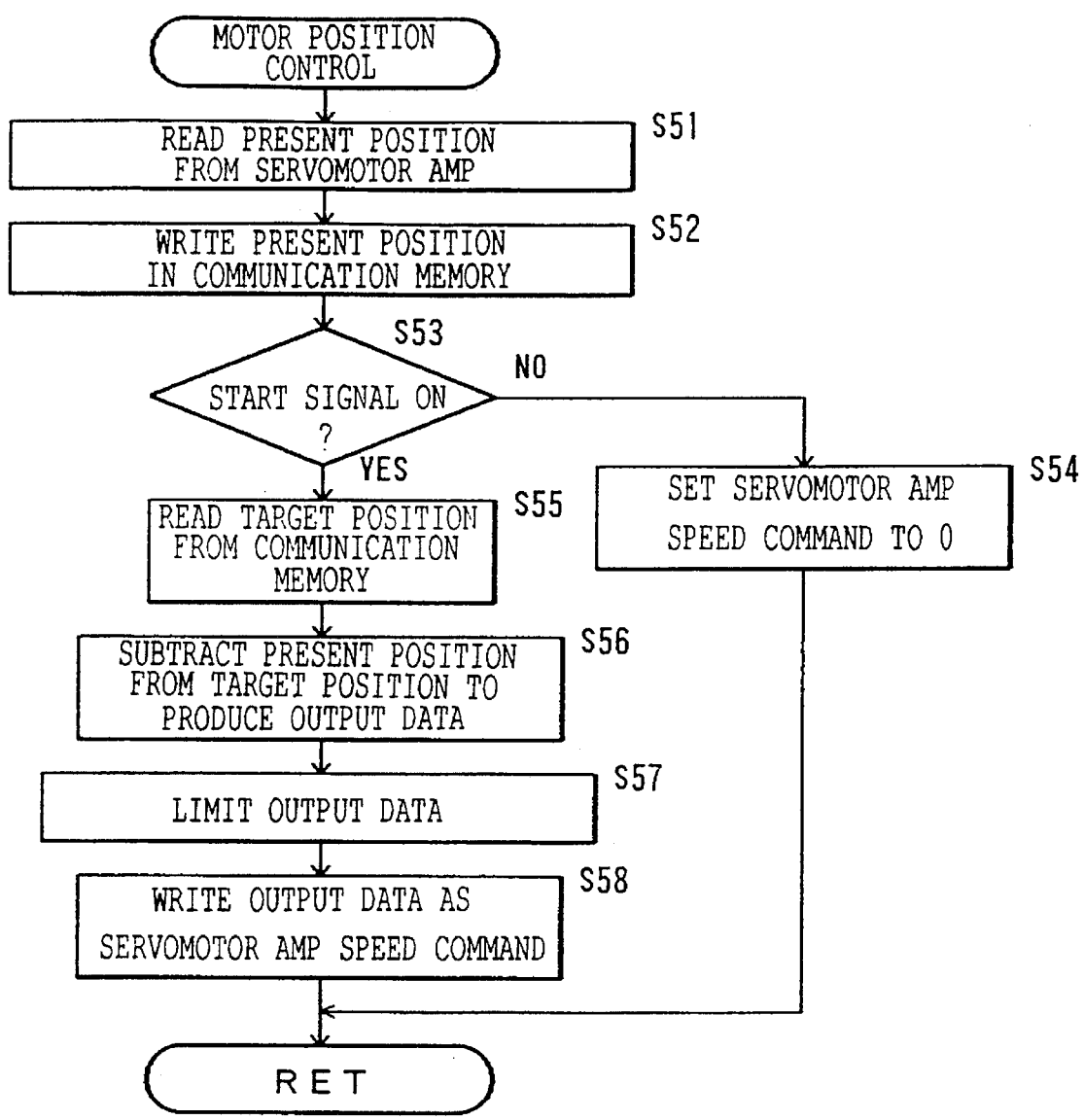
FIG. 10 is a flowchart showing a processing sequence in a positioning control processor.

FIG. 10 shows a processing sequence of the positioning control processors 14a1, 14b1 of the real-time processor 14. The positioning control processors 14a1, 14b1 read present positions of the servomotors 30a, 30b from the servomotor amplifiers 34a, 34b in a step S51, and then write the present positions in the present position data 40a, 40b in the communication memory 16.

Thereafter, the positioning control processors 14a1, 14b1 determine whether a start signal is on or not in a step S53. If not on, the positioning control processors 14a1, 14b1 set "0" to speed commands to be supplied to the servomotor amplifiers 34a, 34b in a step S54. If on, the positioning control processors 14a1, 14b1 read the target positions 36a, 36b from the communication memory 16 in a step S55.

Then, the positioning control processors 14a1, 14b1 subtract the present positions from the target positions 36a, 36b to generate data to be outputted to the servomotor amplifiers 34a, 34b in a step S56. The positioning control processors 14a1, 14b1 then limit the data to be outputted to the servomotor amplifiers 34a, 34b in a step S57. The positioning control processors 14a1, 14b1 write the limited data to be outputted as the speed commands to be supplied to the servomotor amplifiers 34a, 34b in a step S58, after which the processing comes to an end. Based on the speed commands, the servomotor amplifiers 34a, 34b energize the servomotors 30a, 30b, and the present positions thereof are detected by the respective position detectors 32a, 32b and reported to the positioning control processors 14a1, 14b1. The present position data 40a, 40b are transmitted from the real-time processor 14 through the communication memory 16 to the multitask processor 12.

Since simultaneous arrival processing is carried out by the multitask processor 12 (main control side), but not by the real-time processor 14 (servo control side), an error produced when step up occurs cannot be corrected, and a positional deviation may arise. According to the present invention, both the real-time processor 14 and the multitask processor 12 have present position data, and distances to be traversed up to the target positions are calculated from the present position data to prevent such a positional deviation.

Figure 11:
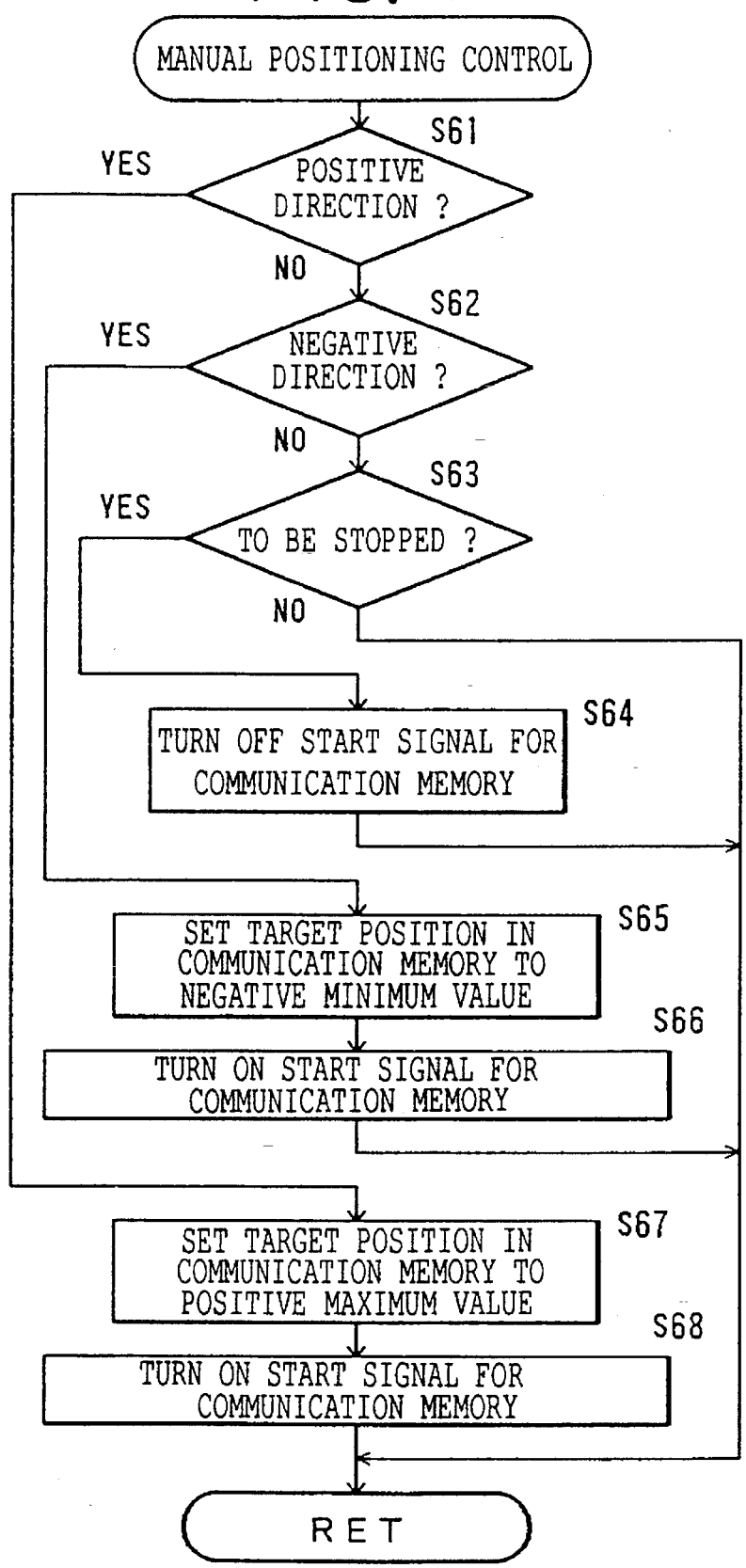
FIG. 11 is a flowchart showing a processing sequence for positioning control effected manually from the control box.

FIG. 11 shows a processing sequence for positioning control effected manually from the control box 22. When commands are to be given from the control box 22 through the positioning driver 33 to the servomotors 30a, 30b for positional control, it is determined whether the direction of movement of the servomotors 30a, 30b is positive or not in a step S61, and whether the direction of movement is negative or not in a step S62. If the direction of movement is positive, then control goes to a step S67 in which the target positions 36a, 36b in the communication memory 16 are set to a positive maximum value. Thereafter, a start signal for the communication memory 16 is turned on in a step S68.

If the direction of movement is negative, then control goes to a step S65 in which the target positions 36a, 36b in the communication memory 16 are set to a negative minimum value. Thereafter, the start signal for the communication memory 16 is turned on in a step S66. If the direction of movement is neither positive nor negative, then it is determined whether the servomotors 30a, 30b are to be stopped or not in a step S63. If not to be stopped, then the processing is finished. If to be stopped, then the start signal for the communication memory 16 is turned off in a step S64. Thereafter, the processing comes to an end.

Figure 12:
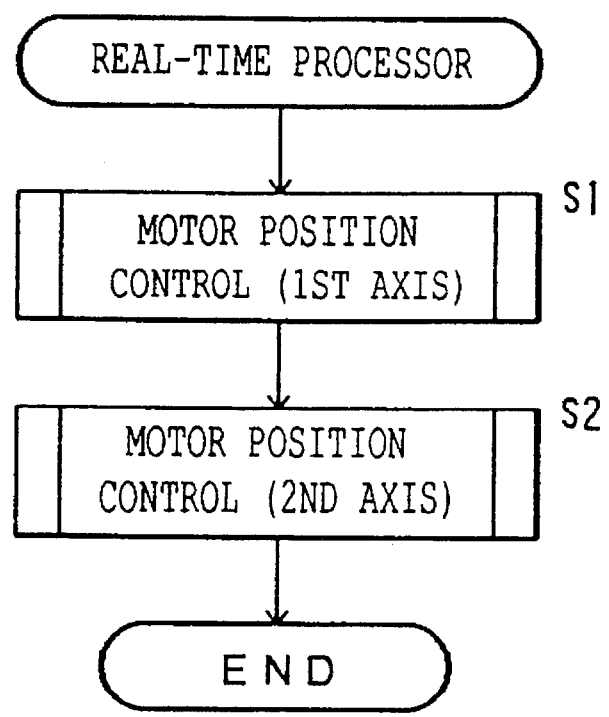
FIG. 12 is a flowchart showing a positioning sequence in a real-time processor.

FIG. 12 illustrates a positioning sequence of the real-time processor. According to the processing (see FIGS. 3, 4, and 9) of the application tasks 42a, 42b of the multitask processor 12, the real-time processor 14 effects positional control of the first-axis motor in a step S1, and then effects positional control of the second-axis motor in a step S2 (see the processing sequence shown in FIG. 10).

Figure 13:
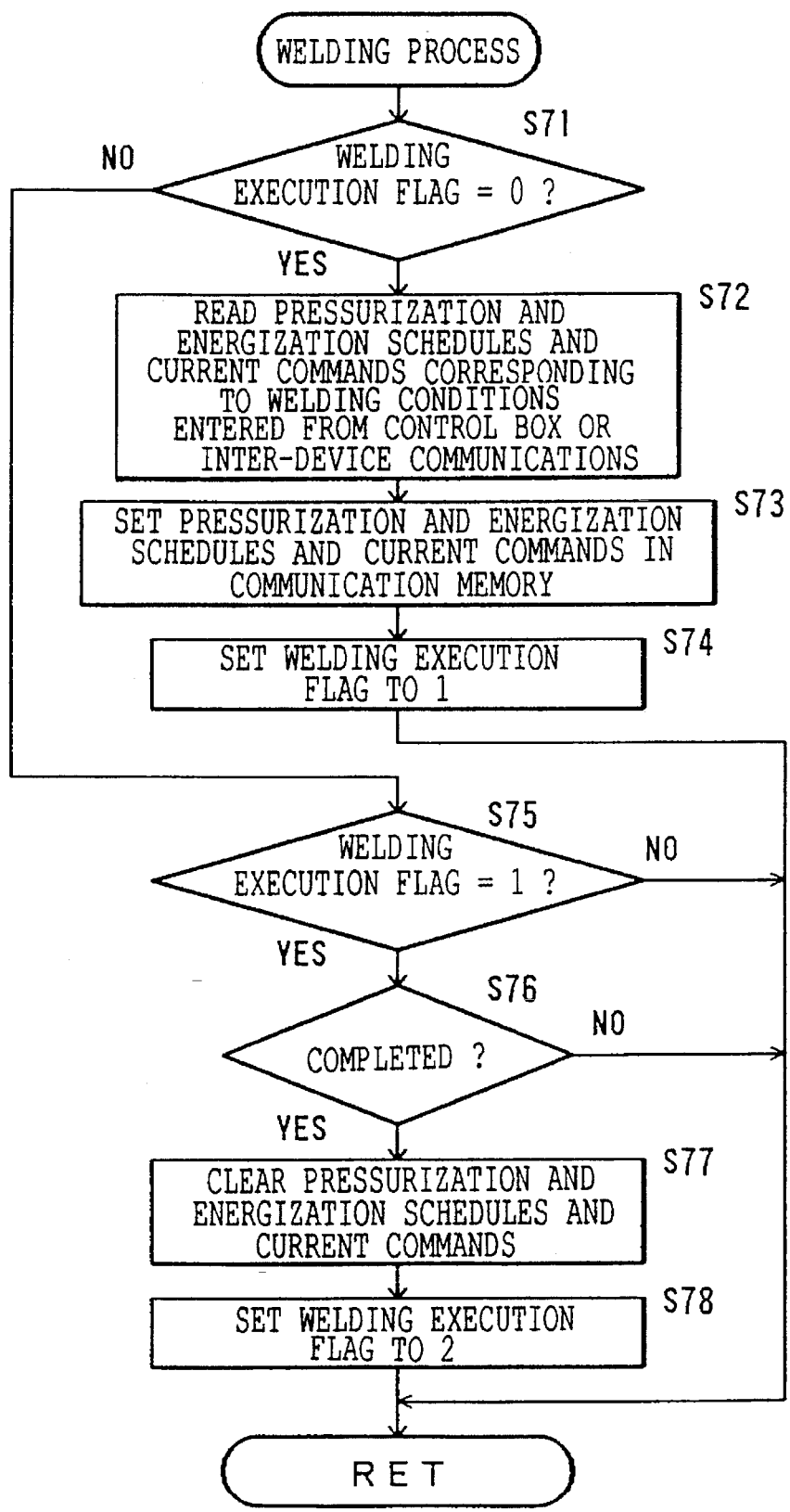
FIG. 13 is a flowchart showing a welding sequence of an application task.

FIG. 13 shows a welding sequence of the application tasks 42a, 42b. The application tasks 42a, 42b determine whether a welding execution flag is "0" or not in a step S71. If the welding execution flag is "0", then the application tasks 42a, 42b, as illustrated in FIG. 4, read pressurization and energization schedules and current commands corresponding to welding conditions entered from the control box 22 or interdevice communications, from the memory in a step S72. Thereafter, the application tasks 42a, 42b write the read data into the current commands 56a, 56b and the pressurization commands 58a, 58b in the communication memory 16 in a step S73, after which the application tasks 42a, 42b set the welding execution flag to "1" in a step S74.

The gun/transformer control processors 14a2, 14b2 of the real-time processor 14 transmit current commands and PWM commands to the inverters 54a, 54b, respectively, enabling the transformers 52a, 52b and the welding guns 50a, 50b to weld workpieces under specified pressures according to specified energization schedules, so that the currents are controlled so as to be constant for energizing the welding guns 50a, 50b with specified currents.

If the welding execution flag is not "0", then the application tasks 42a, 42b determine whether the welding execution flag is "1" or not in a step S75. If the welding execution flag is "1", then the application tasks 42a, 42b determine whether the welding process is completed or not in a step S76. If completed, then the application tasks 42a, 42b clear the pressurization and energization schedules and the current commands, and reset the current commands 56a, 56b and the pressurization commands 58a, 58b in the communication memory 16 in a step S77. Thereafter, the application tasks 42a, 42b set the welding execution flag to "2" in a step S78, after which the processing is finished. If the welding execution flag is not "1" in the step S75, the processing is finished.

Figure 14:
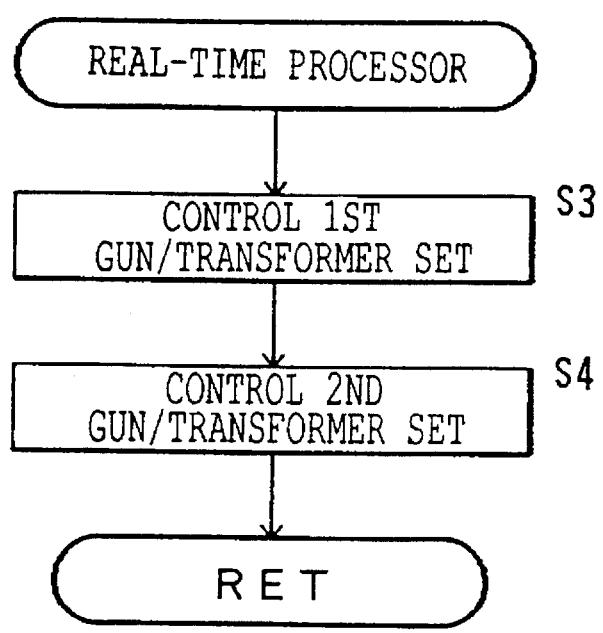
FIG. 14 is a flowchart showing a welding sequence in the real-time processor.

FIG. 14 shows a welding sequence of the real-time processor. According to the processing (see FIGS. 4 and 12) of the application tasks 42a, 42b of the multitask processor 12, the real-time processor 14 effects control of the first gun/transformer set in a step S3, and then effects control of the second gun/transformer set in a step S4.

Although certain preferred embodiments of the present invention has been shown and described in detail, it should be understood that various changes and modifications may be made therein without departing from the scope of the appended claims.

What is claimed is:

1. A welding robot control system for controlling a plurality of welding robots, comprising:

a plurality of welding robots each of which is connected to a common signal line;

a multitask processor including a plurality of application task means corresponding to each of said welding robots, said plurality of application task means performing parallel processing on a time-shared basis of a plurality of processes which are to be affected respectively by each of said welding robots;

real-time welding robot processing means for performing operational control and position decisional control of each of the said welding robots;

a communications memory tier transmitting and receiving predetermined instructions and data liar the operational control and the position decisional control between said application task means of said multitask processor and said real-time welding robot processing means; and inter-task signal communication means for communicating signals including signals related to said welding robots between respective application task means, wherein said multitask processor and said real-time welding robot processing means are provided as subcomponents of a control system physically separated from each of said welding robots, both multitasking and real-time welding robot processing operations being performed in said control system prior to transmitting corresponding command signals to said welding robots, wherein the command signals are conveyed between said real-time welding robot processing means and each of said welding robots which are physically separated from the control system.

2. The welding robot control system of claim 1, wherein each of said welding robots include a welding device for welding a workpiece and a positioning device for positioning said welding device relative to the workpiece.

3. The welding robot control system of claim 2, said real-time welding robot processing means further including:

real-time positioning device processing means for performing operational control and position decisional control of each of the logical axes of said positioning devices; and real-time welding device processing means for performing energization and pressurization control of each of the welding devices to weld the workpiece, wherein said communications memory transmits target position data and receives position data for the operational control and the position decisional control of said positioning devices between said application task means of said multitask processor and said real-time positioning device processing means, wherein said communications memory transmits pressurization and energization data and receives completion data for controlling said welding devices between said application task means of said multitask processor and said real-time welding device processing means.

4. The welding robot control system of claim 2, said multitask processor further including:

a plurality of application task means corresponding to each of said welding devices and to respective logical axes of each of said positioning devices, said plurality of application task means performing parallel processing on a time-shared basis of welding operations and positioning operations which are to be performed respectively by each of said welding devices and said positioning devices, said inter-task signal communication means communicating signals including signals related to said welding devices and said positioning devices between respective application task means.

5. The welding robot control system according to claim 1, wherein the number of the welding robots along said common signal line can be increased.

6. The welding robot control system according to claim 1, said multitask processor further including PLC task means for processing sequencing data and providing the sequencing data to at least one of said application task means.

7. The welding robot control system according to claim 1, said inter-task signal communication means further including communication signal buffers corresponding to each of said welding robots.

8. A control system for providing operational control to a plurality of controlled devices which are interconnected along a common signal line, comprising:

a multitask processor including a plurality of application task means corresponding to respective logical axes of each of the plurality of controlled devices, said plurality of application task means performing parallel processing on a time-shared basis of a plurality of processes which are to be affected respectively by each of the plurality of controlled devices;

real-time processing means for performing operational control and position decisional control of each of the logical axes;

a communications memory for transmitting and receiving predetermined instructions and data for the operational control and the position decisional control between said application task means of said multitask processor and said real-time processing means; and inter-task signal communication means for communicating signals including signals related to the plurality of controlled devices between respective application task means, wherein said multitask processor and said real-time processing means are provided as sub-components of the control system physically separated from each of the plurality of controlled devices, both multitasking and real-time processing operations being performed in said control system prior to transmitting corresponding command signals to the plurality of controlled devices, wherein command signals are conveyed between said real-time processing means and each of said plurality of controlled devices which are physically separated from the control system.

9. The control system according to claim 8, wherein the number of the plurality of controlled devices along said common signal line can be increased.

10. The control system according to claim 9, said multitask processor further comprising a PLC task, wherein information is sent and received for PLC sequencing, and the result of said PLC sequencing is provided to at least one of said application task means.

11. The control system according to claim 10, said inter-task signal communication means further comprising a communication signal buffer corresponding to each of the logical axes of the plurality of controlled devices.

* * * * *